(12) United States Patent
Ishikawa

(10) Patent No.: US 12,321,429 B2
(45) Date of Patent: Jun. 3, 2025

(54) FACE AUTHENTICATION APPARATUS, CONTROL METHOD AND NON-TRANSITORY COMPUTER-READABLE STORAGE MEDIUM THEREFOR, FACE AUTHENTICATION GATE APPARATUS, AND CONTROL METHOD AND NON-TRANSITORY COMPUTER-READABLE STORAGE MEDIUM THEREFOR

(71) Applicant: NEC Corporation, Tokyo (JP)

(72) Inventor: Masumi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 17/790,170

(22) PCT Filed: Jan. 16, 2020

(86) PCT No.: PCT/JP2020/001242
§ 371 (c)(1),
(2) Date: Jun. 30, 2022

(87) PCT Pub. No.: WO2021/144910
PCT Pub. Date: Jul. 22, 2021

(65) Prior Publication Data
US 2023/0042100 A1 Feb. 9, 2023

(51) Int. Cl.
*G06V 40/50* (2022.01)
*G06F 21/32* (2013.01)
(Continued)

(52) U.S. Cl.
CPC ............ *G06F 21/32* (2013.01); *G06V 10/141* (2022.01); *G06V 10/56* (2022.01); *G06V 10/60* (2022.01);
(Continued)

(58) Field of Classification Search
CPC ...... G06F 21/32; G06V 10/141; G06V 10/56; G06V 10/60; G06V 10/761; G06V 40/161;
(Continued)

(56) References Cited

U.S. PATENT DOCUMENTS 8,353,004 B2 * 1/2013 Senga .................... G06V 40/40
726/2
10,061,976 B2 8/2018 Bludau et al.
(Continued)

FOREIGN PATENT DOCUMENTS

CN 107909011 A 4/2018
CN 108650247 A * 10/2018
(Continued)

OTHER PUBLICATIONS

IN Office Action for IN Application No. 202217040034, mailed on Dec. 13, 2022 with English Translation.
(Continued)

*Primary Examiner* — Bobbak Safaipour
*Assistant Examiner* — Joshua Chen

(57) ABSTRACT

A face authentication apparatus (50) includes an image generation unit (102) that generates a first image by capturing an image of a person, a control unit (104) that, when the first image does not satisfy a criterion for face collation, controls lighting and causes the image generation unit (102) to generate a second image by capturing an image of the person again, and a face authentication unit (52) that executes face authentication by using the second image.

28 Claims, 12 Drawing Sheets

(51) Int. Cl.
*G06V 10/141* (2022.01)
*G06V 10/56* (2022.01)
*G06V 10/60* (2022.01)
*G06V 10/74* (2022.01)
*G06V 40/16* (2022.01)

(52) U.S. Cl.
CPC .......... *G06V 10/761* (2022.01); *G06V 40/161* (2022.01); *G06V 40/169* (2022.01); *G06V 2201/07* (2022.01)

(58) Field of Classification Search
CPC .. G06V 40/169; G06V 2201/07; G06V 40/50; G06V 40/172
See application file for complete search history.

(56) References Cited

U.S. PATENT DOCUMENTS

| | | | | |
|---|---|---|---|---|
| 10,372,973 | B2* | 8/2019 | Davis | G06V 40/161 |
| 2007/0189583 | A1 | 8/2007 | Shimada et al. | |
| 2010/0246904 | A1* | 9/2010 | Yamashita | G06V 40/166 382/118 |
| 2013/0015946 | A1* | 1/2013 | Lau | G06V 40/172 340/5.2 |
| 2013/0301886 | A1 | 11/2013 | Koda | |
| 2017/0161906 | A1 | 6/2017 | Davis et al. | |
| 2019/0130544 | A1* | 5/2019 | Kitajima | H04N 23/60 |
| 2019/0303551 | A1 | 10/2019 | Tussy | |
| 2019/0340421 | A1 | 11/2019 | Boenapalli et al. | |
| 2022/0004742 | A1 | 1/2022 | Hu et al. | |

FOREIGN PATENT DOCUMENTS

| | | |
|---|---|---|
| CN | 108710833 A | 10/2018 |
| CN | 110458062 A | 11/2019 |
| JP | H11-316836 A | 11/1999 |
| JP | 2004-030156 A | 1/2004 |
| JP | 3580129 B2 * | 10/2004 |
| JP | 2007-148988 A | 6/2007 |
| JP | 2008-035480 A | 2/2008 |
| JP | 6151582 B2 * | 6/2017 |
| JP | 2019-032694 A | 2/2019 |
| KR | 10-1472845 B1 | 12/2014 |
| WO | 2007/135735 A1 | 11/2007 |

OTHER PUBLICATIONS

Extended European Search Report for EP Application No. 20913834.6, dated on Jan. 2, 2023.
International Search Report for PCT Application No. PCT/JP2020/001242, mailed on Mar. 31, 2020.
SG Office Action for SG Application No. 11202251254K, issued on Dec. 27, 2024 with English Translation.

* cited by examiner

FACE AUTHENTICATION APPARATUS, CONTROL METHOD AND NON-TRANSITORY COMPUTER-READABLE STORAGE MEDIUM THEREFOR, FACE AUTHENTICATION GATE APPARATUS, AND CONTROL METHOD AND NON-TRANSITORY COMPUTER-READABLE STORAGE MEDIUM THEREFOR This application is a National Stage Entry of PCT/JP2020/001242 filed on Jan. 16, 2020, the contents of all of which are incorporated herein by reference, in their entirety.

TECHNICAL FIELD

Some non-limiting embodiments relate to a face authentication apparatus, a control method and a program therefor, a face authentication gate apparatus, and a control method and a program therefor

BACKGROUND ART

With progress in the image recognition technology, practical application of an authentication apparatus using a facial image of a person at entry and exit into and from a facility or the like requiring security management has advanced in recent years, and various technologies for improving recognition precision of such an apparatus have been proposed.

Patent Document 1 describes determining a backlighted scene, based on brightness of a face and an ambient environment and performing strobe light control, light emitting diode (LED) lighting control, parameter control of a camera, and image correction, based on the determination result of the scene.

Patent Document 2 describes selecting a face of a walker suitable for authentication at a gate through which a moving person passes, by controlling a parameter of a camera, based on environmental information of a surrounding area.

RELATED DOCUMENTS

Patent Documents

Patent Document 1: Japanese Patent Application Publication No. 2008-35480
Patent Document 2: Japanese Patent Application Publication No. 2007-148988

SUMMARY

Technical Problem

In the aforementioned patent documents, a parameter of a camera is set based on an ambient environment in order to improve face authentication performance. When thus adjusting to an ambient environment by parameter setting of a camera, parameter control such as changing a shutter speed or a diaphragm may take time relative to speed of a walking person, depending on the camera.

An object of some non-limiting embodiments is to improve authentication precision by capturing, with a camera, a facial image suitable for face authentication.

Solution to Problem

In order to solve the aforementioned problem, aspects of some non-limiting embodiments employ the following configurations, respectively.

A first aspect relates to a face authentication apparatus.

A face authentication apparatus according to the first aspect includes:

an image generation unit that generates a first image by capturing an image of a person;

a control unit that, when the first image does not satisfy a criterion for face collation, controls lighting and causes the image generation unit to generate a second image by capturing an image of the person again; and a face authentication unit that executes face authentication by using the first image or the second image.

A second aspect relates to a face authentication apparatus control method executed by at least one computer.

A face authentication apparatus control method according to the second aspect includes, by a face authentication apparatus:

generating a first image by capturing an image of a person;

when the first image does not satisfy a criterion for face collation, controlling lighting and generating a second image by capturing an image of the person again; and executing face authentication by using the first image or the second image.

A third aspect relates to a face authentication gate apparatus.

A face authentication gate apparatus according to the third aspect includes a gate opening-closing control unit that controls opening and closing of a gate through which a person passes, by using a face authentication result of face authentication executed by the face authentication apparatus according to the aforementioned first aspect by using a first image or a second image generated by capturing an image of the person passing through the gate.

A fourth aspect relates to a face authentication gate apparatus control method executed by at least one computer.

A face authentication gate apparatus control method according to the fourth aspect includes, by a face authentication gate apparatus, controlling opening and closing of a gate through which a person passes, by using a face authentication result of face authentication executed by the face authentication apparatus according to the aforementioned first aspect by using a first image or a second image generated by capturing an image of the person passing through the gate.

Note that another aspect of some non-limiting embodiments may be a program causing at least one computer to execute the method according to the aforementioned second or fourth aspect or may be a computer-readable storage medium on which such a program is recorded. The storage medium includes a non-transitory tangible medium.

The computer program includes a computer program code causing a computer to implement the control method on the face authentication apparatus or the face authentication gate apparatus when being executed by the computer.

Note that any combination of the components described above, and representations of some non-limiting embodiments converted among a method, an apparatus, a system, a storage medium, a computer program, and the like are also valid as embodiments.

Further, various components of some non-limiting embodiments do not necessarily need to be individually independent, and, for example, a plurality of components may be formed as a single member, a plurality of members may form a single component, a certain component may be part of another component, and part of a certain component may overlap with part of another component.

Further, while a plurality of procedures are described in a sequential order in the method and the computer program according to some non-limiting embodiments, the order of description does not limit the order in which the plurality of procedures are executed. Therefore, when the method and the computer program according to some non-limiting embodiments are implemented, the order of the plurality of procedures may be changed without affecting the contents.

Furthermore, a plurality of procedures in the method and the computer program according to some non-limiting embodiments are not limited to be executed at timings different from each other. Therefore, for example, another procedure may occur during execution of a certain procedure, and a part or the whole of an execution timing of a certain procedure may overlap with an execution timing of another procedure.

Advantageous Effects

Some non-limiting embodiments enable improvement in authentication precision by capturing, with a camera, a facial image suitable for face authentication.

BRIEF DESCRIPTION OF THE DRAWINGS

The aforementioned object, other objects, features and advantages will become more apparent by use of the following preferred example embodiments and accompanying drawings.

DESCRIPTION OF EMBODIMENTS

Example embodiments will be described below by using drawings. Note that in every drawing, similar components are given similar signs, and description thereof is omitted as appropriate.

"Acquisition" in the example embodiment includes at least one of fetching (active acquisition), by an own apparatus, data or information stored in another apparatus or storage medium and inputting (passive acquisition), to an own apparatus, data or information output from another apparatus. Examples of active acquisition include requesting or inquiring another apparatus for data or information to receive a reply therefrom, accessing another apparatus or storage medium to read out data or information therefrom, and the like. Further, examples of passive acquisition include receiving delivered (transmitted, push-notified, or the like) information, and the like. Furthermore, "acquisition" may be selectively acquiring received data or information, or may be selectively receiving delivered data or information.

First Example Embodiment

<System Configuration>

Figure 1:
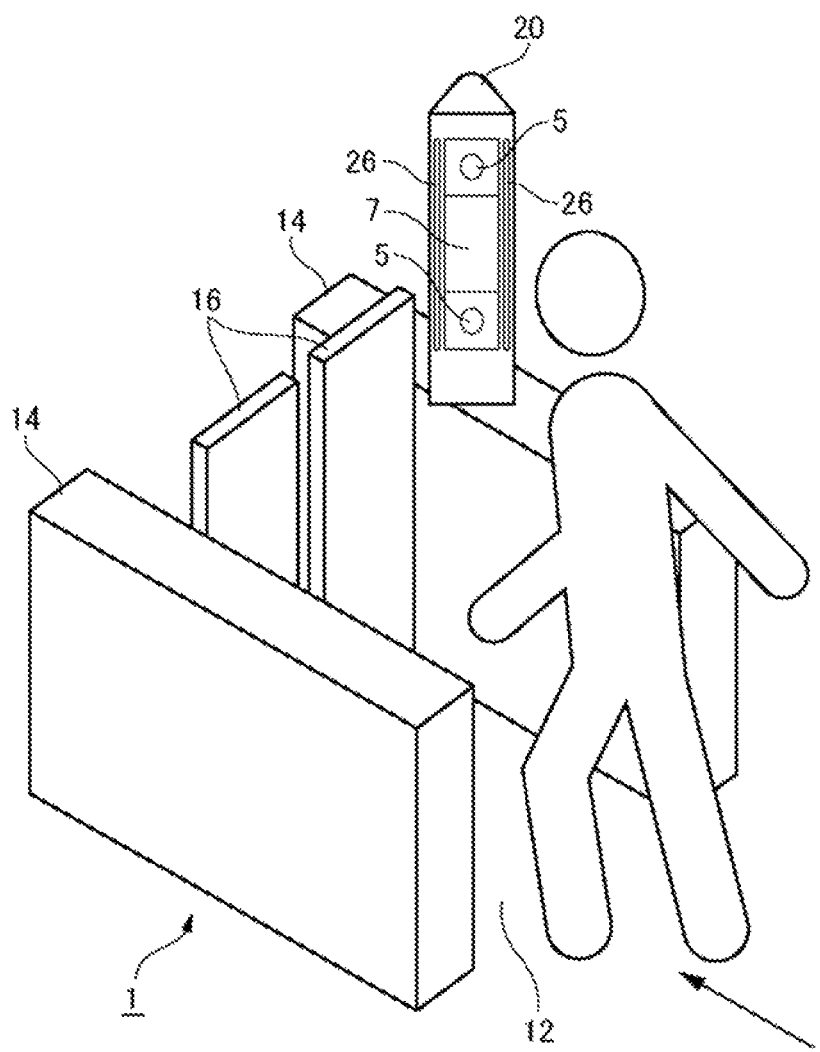
FIG. 1 is a diagram illustrating a conceptual configuration example of a face authentication gate system according to an example embodiment.

FIG. 1 is a diagram illustrating a conceptual configuration example of a face authentication gate system 1 according to an example embodiment.

The face authentication gate system 1 includes a face authentication apparatus 10 (not illustrated in FIG. 1), a housing 14, and a camera unit 20.

The face authentication apparatus 10 performs authentication processing of a person by checking a feature value of a facial image of a preregistered person against a feature value extracted from a facial. image of the person. Note that authentication processing of a person performed by the face authentication apparatus 10 may be performed by collating using a feature value of an iris besides face collation using a feature value of a face. For example, information about a feature value of at least one of a face and an iris of a person is tied to identification information of a user and is registered in a database (unillustrated) or the like when performing preregistration for use of this system (or for example, an existing system such as a check-in system at an airport). Alternatively, a feature value of at least one of a face and an iris of a person included in a blacklist, whitelist, or the like may be registered in a database.

While the face authentication apparatus 10 is provided by a computer as will be described later, a face authentication processing function may be provided by a computer separate from the face authentication apparatus 10, such as a cloud server. In that case, the face authentication apparatus 10 functions as an image processing apparatus (unillustrated). Further, a computer providing the face authentication apparatus 10 or the image processing apparatus may be included in a housing of the camera unit 20 or may be separate from the camera unit 20.

For example, the face authentication apparatus 10 (including the housing 14 and the camera unit 20) in the face authentication gate system 1 according to the present example embodiment is installed at a boarding gate at an airport. The face authentication apparatus 10 may be installed at an entry/exit gate of a room in which entering and exiting persons are managed. Alternatively, the face authentication apparatus 10 may be combined with a payment terminal for cashless payment and be installed as a gate for the payment terminal at a store or the like. Alternatively, the face authentication apparatus 10 may be installed as a gate at an entrance of an unmanned store. In addition, the face authentication apparatus 10 is applicable in a case of occurrence of a change in a light environment based on an installation location of the face authentication apparatus 10 or a change in the light environment due to a change in outdoor light according to the time of the day.

Figure 2:
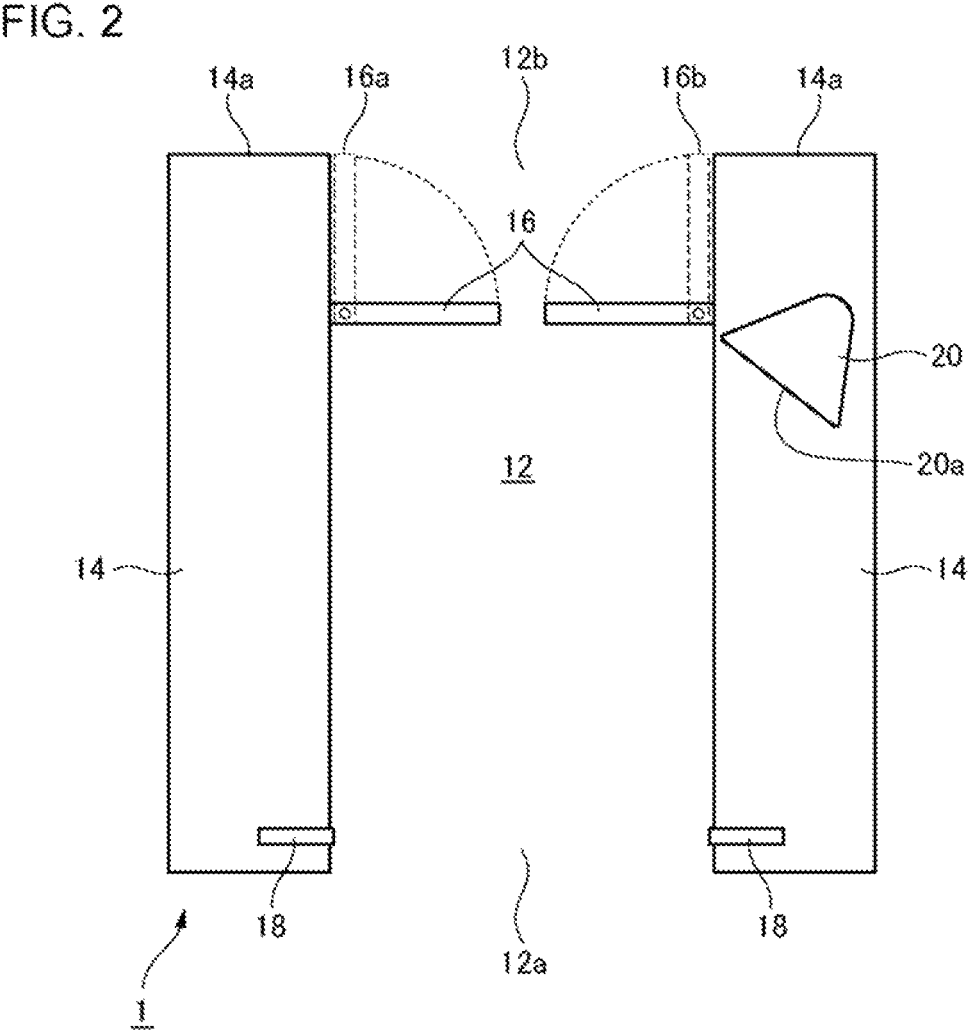
FIG. 2 is a plan view of the face authentication gate system viewed from above.

FIG. 2 is a plan view of the face authentication gate system 1 viewed from above. The housing 14 has a predetermined height and extends across a predetermined distance along an aisle 12 along which a person passes. Two housings 14 are installed side by side along the aisle 12 with a predetermined distance in between on both sides of the aisle 12. The two housings 14 are preferably installed in parallel.

An entrance 12a side of the aisle 12 is open. Opening-closing flap doors 16 are openably and closably provided on an exit 12b side of the aisle 12. In the example in this diagram, two opening-closing flap doors 16 each including one end being rotatably installed on the housing 14 are provided. In another example, one opening-closing flap door 16 may be rotatably installed at one end of either housing 14. In this example, the opening-closing flap doors 16 are installed flush with end faces 14a of the housings 14 on the exit 12b side or on the inner side of the end faces 14a in such a way that end faces 16a and 16b of the opening-closing flap doors 16 do not protrude from the end faces 14a of the housings 14 on the exit side when the opening-closing flap doors 16 open.

For example, opening-closing control of the opening-closing flap door 16 is performed based on an authentication result by the face authentication apparatus 10. A normal position of the opening-closing flap door 16 may be an open position or a closed position. When face authentication of a person by the face authentication apparatus 10 is successful in a case of the normal position being the open position, opening-closing control of the opening-closing flap door 16 is not performed, and the opening-closing flap door 16 remains in the open position in such a way as to allow the person to pass along the aisle 12. When face authentication is unsuccessful, opening-closing control is performed in such a way as to prevent the person from passing through the aisle 12, and the position of the opening-closing flap door 16 is changed from the open position to the closed position.

When face authentication is successful in a case of the normal position being the closed position, opening-closing control is performed in such a way as to allow the person to pass along the aisle 12, and the position of the opening-closing flap door 16 is changed from the closed position to the open position. When face authentication is unsuccessful, opening-closing control of the opening-closing flap door 16 is not performed, and the opening-closing flap door 16 remains in the closed position in such a way as to prevent the person from passing through the aisle 12.

Figure 3:
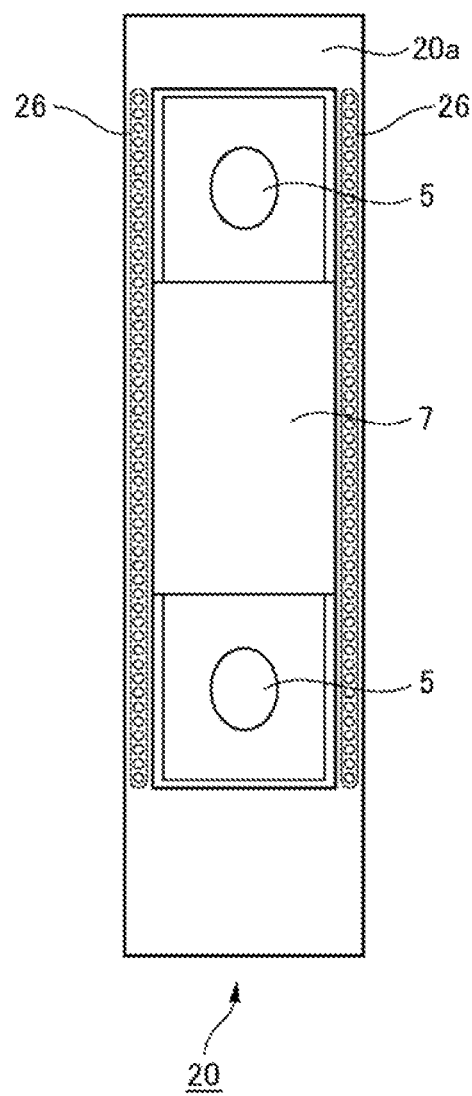
FIG. 3 is a front view illustrating an example of a camera unit.

FIG. 3 is a front view illustrating an example of the camera unit 20.

A display unit 7 is provided at the front of the camera unit 20, and cameras 5 are provided above and below the display unit 7, respectively. Furthermore, LED lighting units 26 are arranged on both sides of the display unit 7 and the camera 5, each LED lighting unit 26 extending in a height direction of the camera unit 20. In this example, the two LED lighting units 26 are placed in parallel. Further, as will be described later, the LED lighting unit 26 is composed of a plurality of liquid crystal displays (LCD), and an LED to be turned on, an illuminance of an LED, and the like can be controlled by a control unit 104.

The camera 5 includes imaging elements such as a lens and a charge coupled device (CCD) image sensor. For example, the camera 5 may have a wireless local area network (LAN) communication function and be connected to the face authentication apparatus 10 through a repeater apparatus (unillustrated) such as a router in a communication network. However, the camera 5 may be connected to the face authentication apparatus 10 in a wired manner. Then, the camera 5 may include a mechanism for performing orientation control of the camera body and the lens, zooming control, focusing, and the like by tracking movement of a person being an image capture target. Examples of the display unit 7 include a liquid crystal display and an organic electro-luminescence (EL) display.

Images generated by the camera 5 are preferably captured and then are transmitted to the face authentication apparatus 10 in real time. However, images transmitted to the face authentication apparatus 10 may not be directly transmitted from the camera 5 or may be images delayed by a predetermined time. Images captured by the camera 5 may be temporarily stored in a separate storage apparatus and may be read from the storage apparatus by the face authentication apparatus 10 sequentially or at predetermined intervals. Furthermore, images transmitted to the face authentication apparatus 10 are preferably dynamic images but may be frame images captured at predetermined intervals or static images.

Functional Configuration Example

Figure 4:
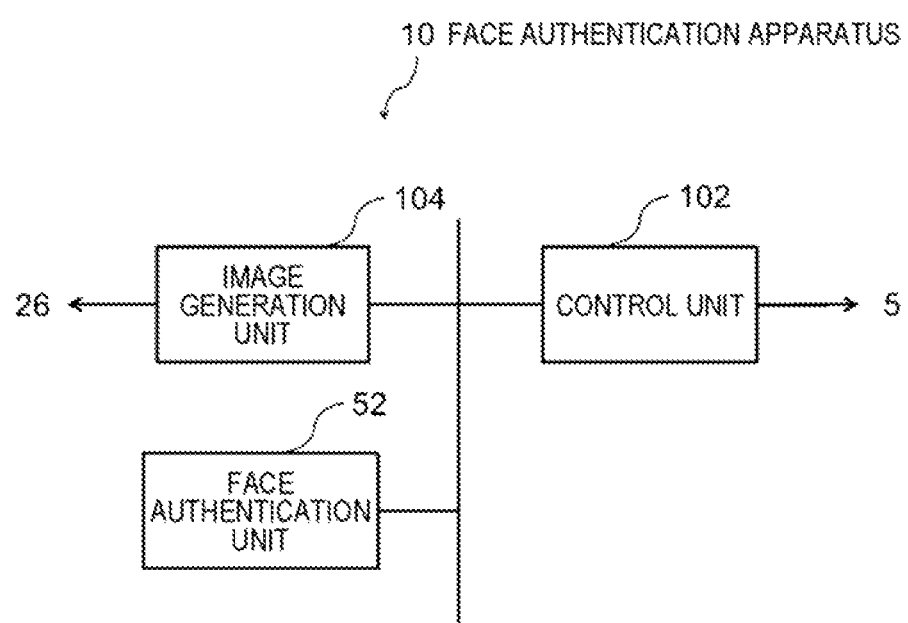
FIG. 4 is a diagram illustrating a functional configuration example of a face authentication apparatus according to the example embodiment.

FIG. 4 is a diagram illustrating a functional configuration example of the face authentication apparatus 10 according to the present example embodiment.

The face authentication apparatus 10 includes an image generation unit 102, the control unit 104, and a face authentication unit 52.

The image generation unit 102 generates a first image by capturing an image of a person. The image generation unit 102 generates a first image by capturing an image of the face of a person passing along the aisle 12 and passing through a gate, by using the camera 5. The control unit 104 controls the LED lighting unit 26 when the first image does not satisfy a criterion for face collation. Furthermore, the control unit 104 generates a second image by causing the image generation unit 102 to capture an image of the person again. The face authentication unit 52 executes face authentication by using the first image or the second image.

Hardware Configuration Example

Figure 5:
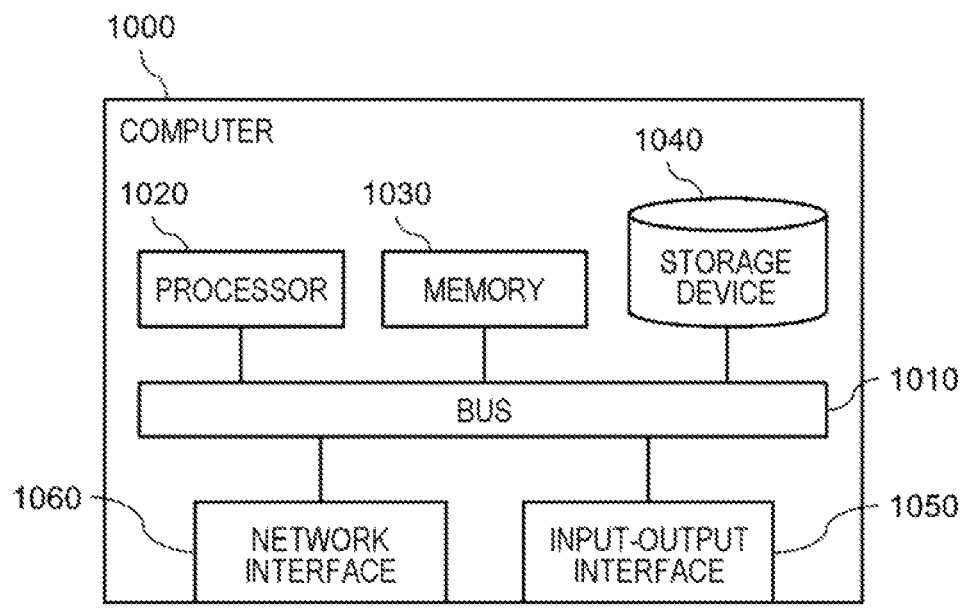
FIG. 5 is a block diagram illustrating a hardware configuration of a computer providing the face authentication apparatus according to the example embodiment.

FIG. 5 is a block diagram illustrating a hardware configuration of a computer 1000 providing the face authentication apparatus 10.

The computer 1000 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules implementing the functions of the face authentication apparatus 10 (such as the image generation unit 102, the control unit 104, and the face authentication unit 52, and a face authentication processing unit 106, a gate opening-closing control unit 108, and a determination unit 110 in a face authentication gate apparatus 100 to be described later). By reading each program module into the memory 1030 and executing the program module by the processor 1020, each function related to the program module is implemented. Further, the storage device 1040 also functions as various storage units.

The input-output interface 1050 is an interface for connecting the face authentication apparatus 10 to various types of input-output equipment (such as the display unit 7, the camera 5, and the LED lighting unit 26).

The network interface 1060 is an interface for connecting the face authentication apparatus 10 to another apparatus on a communication network 3. Note that the network interface 1060 may not be used.

Operation Example

Figure 6:
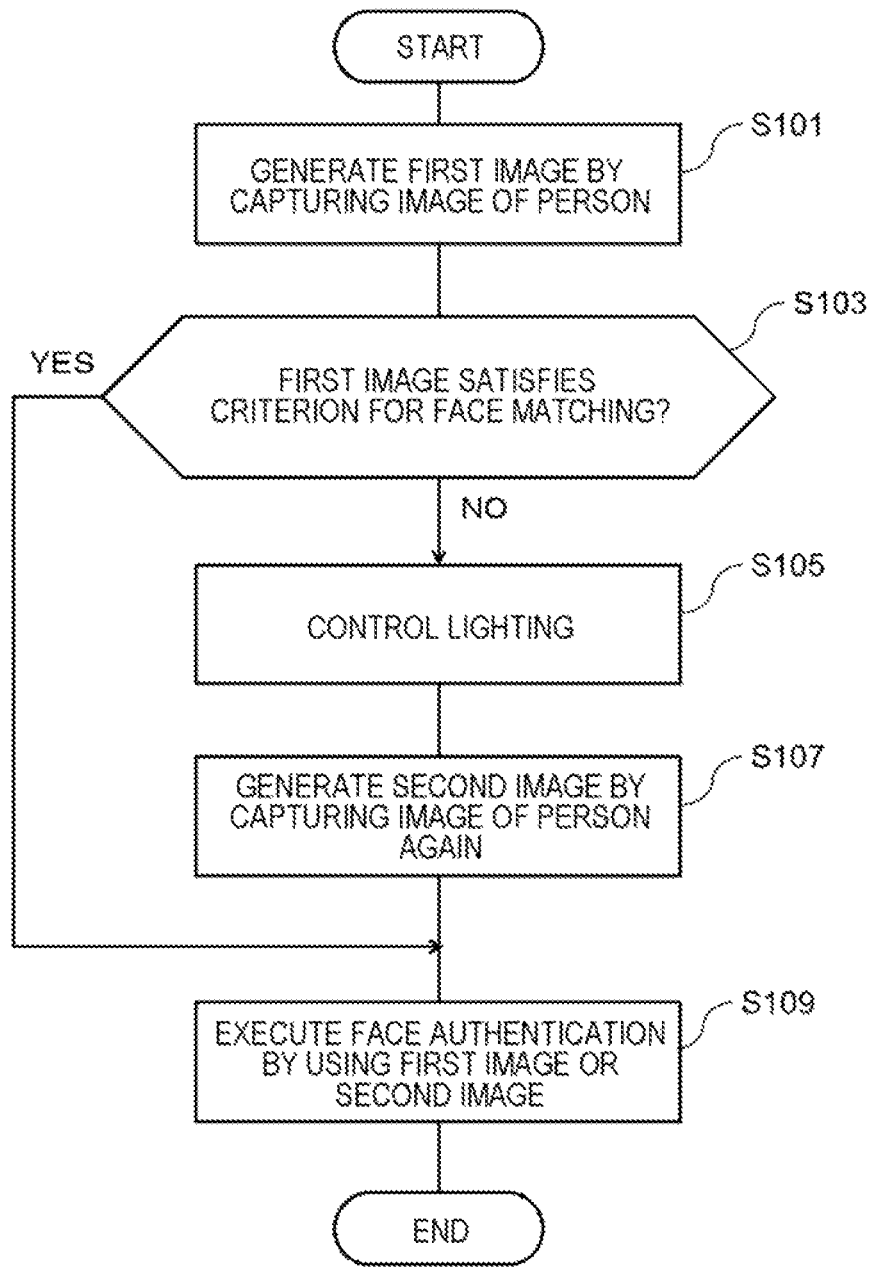
FIG. 6 is a flowchart illustrating an operation example of the face authentication apparatus according to the example embodiment.

FIG. 6 is a flowchart illustrating an operation example of the face authentication apparatus 10 according to the present example embodiment.

First, the image generation unit 102 generates a first image by capturing, by using the camera 5, an image of a person walking along the aisle 12 in order to pass through the gate (Step S101). As illustrated in FIG. 2, an entry sensor 18 is provided on the entrance 12*a* side of the housing 14. Examples of the entry sensor 18 include an infrared sensor. This flow may be started when entry of a person into the aisle 12 is detected by the entry sensor 18. Note that image capture by the camera 5 may always be performed or may be performed at a required timing.

Next, the control unit 104 determines whether the first image generated in Step S101 satisfies a criterion for face collation by the face authentication unit 52 (Step S103). The criterion for face collation is a condition for determining whether color information of the face of a person detected from the first image by the face authentication unit 52 allows face collation with a high degree of reliability.

Color information of a face may be brightness values of pixels belonging to an image area of the entire face or part of the face. When a certain number of pixels or more concentrate on the maximum brightness value in a case of drawing a brightness histogram for all pixels belonging to the image area of the face, the image may be determined to be an image unsuitable for collating (in other words, the image may be determined not to satisfy the criterion for face collation) due to the face being too bright (blown-out highlights being caused). Alternatively, when a certain number of pixels or more concentrate on the minimum brightness value, the image may be determined to be an image unsuitable for collating (in other words, the image may be determined not to satisfy the criterion for face collation) due to the face being too dark (in other words, black crushing being caused in the image area of the face).

Alternatively, when a ratio of the mean brightness value of pixels belonging to the left half of the face to the mean brightness value of pixels belonging to the right half (or a ratio of the mean brightness value of pixels belonging to the right half of the face to the mean brightness value of pixels belonging to the left half) is greater than a predetermined value, the image may be determined to be an image unsuitable for collating (in other words, the image is determined not to satisfy the criterion for face collation) due to one side being too bright or too dark (light being oblique).

Furthermore, when the first image is determined not to satisfy the criterion for face collation (NO in Step S103), the control unit 104 controls the LED lighting unit 26 (Step S105). Then, the control unit 104 causes the image generation unit 102 to generate a second image by capturing an image of the person again (Step S107). On the other hand, when the first image is determined to satisfy the criterion for face collation (YES in Step S103), the control unit 104 bypasses Step S105 to Step S107.

Then, the face authentication unit 52 executes face authentication processing by using the first image or the second image (Step S109). When the first image is determined to satisfy the criterion (YES in Step S103), the face authentication unit 52 uses the first image for the face authentication processing. On the other hand, when the first image is determined not to satisfy the criterion (NO in Step S103), the face authentication unit 52 uses the second image generated in Step S107 for the face authentication processing. The face authentication unit 52 performs face authentication by detecting the face of the person from the first image or the second image and determining a feature value of the face of the person.

According to the present example embodiment, when a first image is determined not to satisfy a criterion for face collation, the LED lighting unit 26 is controlled by the control unit 104 in such a way as to satisfy the criterion for the face collation. Then, a second image is generated by capturing an image of the person again, and face authentication can be executed by the face authentication unit 52.

When a gate for performing face authentication is introduced, an existing facility in particular does not originally assume image capture, and therefore an environment for an installation location of a camera may not be suitable for image capture. For example, inappropriate light environments such as a dark place, backlight, and oblique light exist due to the location facing a window or the lighting position being inappropriate. Therefore, acquisition of a facial image suitable for facial image authentication is at times difficult. In that case, face authentication precision is degraded.

The configuration according to the present example embodiment enables face authentication processing by using a second image captured after controlling lighting in such a way as to satisfy a criterion for face collation instead of performing face authentication by using a first image not satisfying the criterion for face collation and therefore enables face authentication processing using an image suitable for face authentication processing. Therefore, recognition precision is improved. A change in a light environment based on an installation location or a change in a light environment due to a change in outdoor light according to the time of the day as described above can also be accommodated.

Second Example Embodiment

Figure 7:
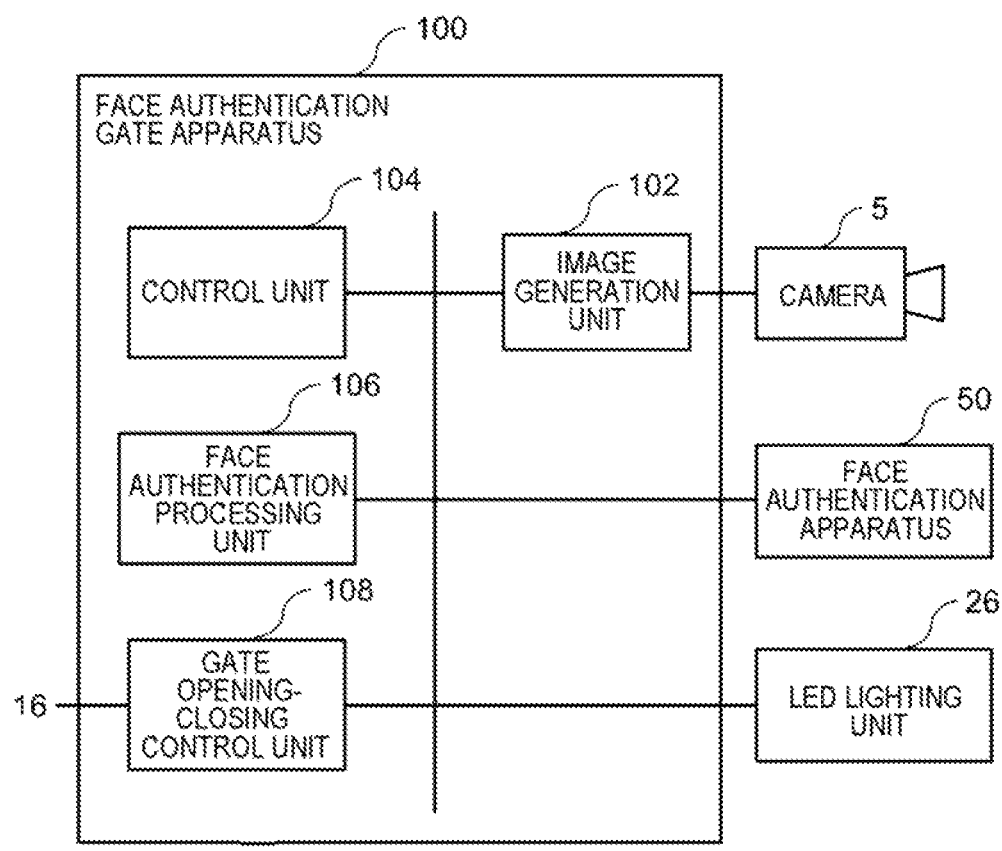
FIG. 7 is a diagram illustrating a functional configuration example of a face authentication gate apparatus according to an example embodiment.

FIG. 7 is a diagram illustrating a functional configuration example of a face authentication gate apparatus 100 according to the present example embodiment. The face authentication gate apparatus 100 according to the present example embodiment is similar to that according to the aforementioned example embodiment except for including a configuration for controlling opening and closing of a gate, based on a result of face authentication. Functions of the face authentication gate apparatus 100 according to the present example embodiment are also provided by the computer 1000 in FIG. 5.

Figure 12:
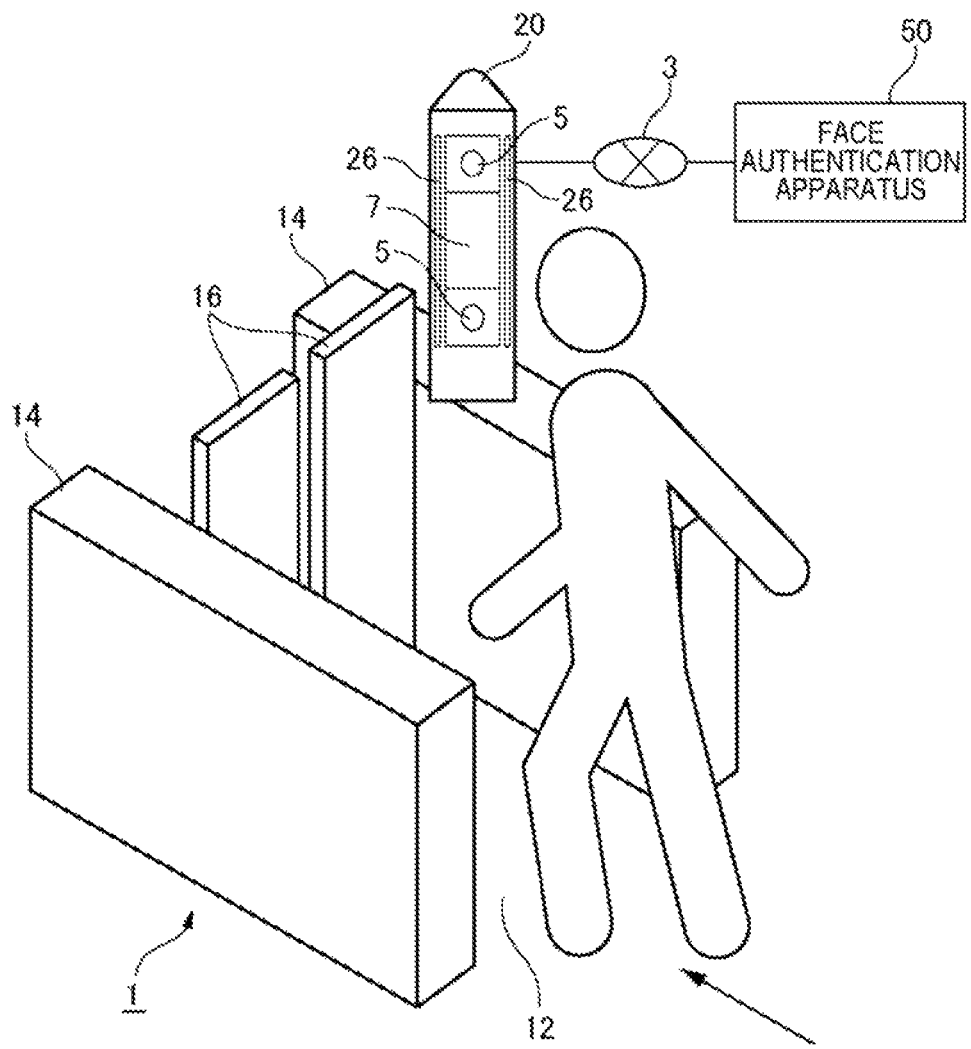
FIG. 12 is a diagram illustrating a conceptual configuration example of the face authentication gate system according to the example embodiment.

As illustrated in FIG. 12, a face authentication unit 52 according to the present example embodiment is a face authentication apparatus 50 separate from the face authentication gate apparatus 100 and, for example, may be a face authentication apparatus 50 operating on a cloud server connected through a communication network 3.

The face authentication gate apparatus 100 in FIG. 7 includes an image generation unit 102 and a control unit 104 that are the same as those in the face authentication apparatus 10 in FIG. 4 and further includes a face authentication processing unit 106 and a gate opening-closing control unit 108.

The image generation unit 102 generates a first image or a second image by capturing an image of a person passing through a gate. The face authentication processing unit 106 causes the face authentication apparatus 50 instead of the face authentication unit 52 according to the aforementioned example embodiment to execute face authentication by using a first image or a second image. By using a face authentication result by the face authentication apparatus 50, the gate opening-closing control unit 108 controls opening and closing of a gate (opening-closing flap door 16) through which a person passes.

Figure 8:
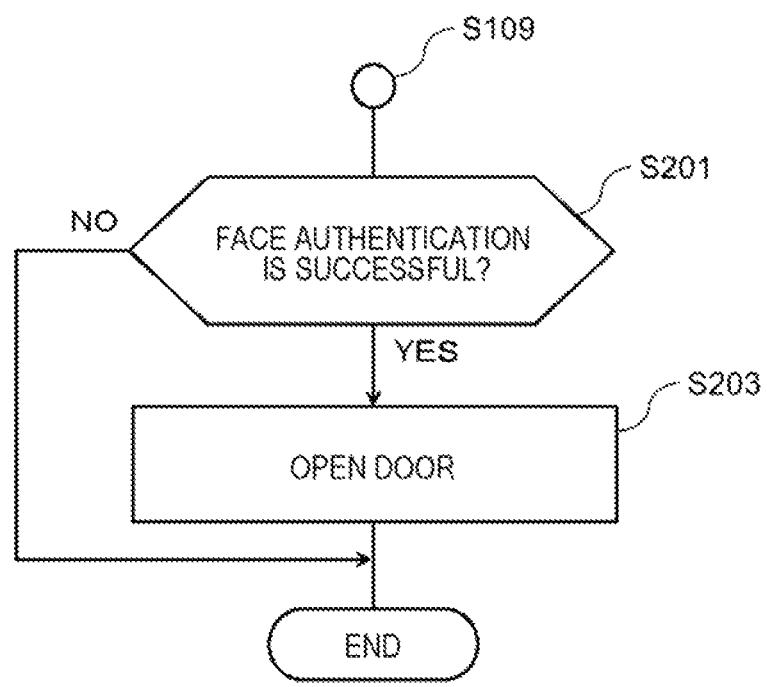
FIG. 8 is a flowchart illustrating an operation example of a gate opening-closing control unit in the face authentication gate apparatus according to the example embodiment.

FIG. 8 is a flowchart illustrating an operation example of the gate opening-closing control unit 108 according to the present example embodiment. After face authentication processing by the face authentication apparatus 50 is performed in Step S109, the gate opening-closing control unit 108 determines whether the face authentication is successful, based on the face authentication result (Step S201). When the face authentication is successful (YES in Step S201), the gate opening-closing control unit 108 opens the gate by controlling the opening-closing flap door 16 to the open position (Step S203). On the other hand, when the face authentication is unsuccessful (NO in Step S201), the gate opening-closing control unit 108 bypasses Step S203 and ends the processing. In other words, the opening-closing flap door 16 remains in the closed position.

A case of the opening-closing flap door 16 being normally in the closed position has been described in this example. When the face authentication is successful in Step S201 in a case of the opening-closing flap door 16 being normally in the open position, the opening-closing flap door 16 remains in the open position. When the face authentication is unsuccessful in Step S201, the gate opening-closing control unit 108 closes the gate by controlling the opening-closing flap door 16 to the closed position.

As described above, the present example embodiment enables opening-closing control of the gate by the gate opening-closing control unit 108, based on a result of highly precise face authentication. Therefore, the probability of unsuccessful authentication as a result of performing face authentication by using a facial image unsuitable for face authentication decreases. Since face authentication can be performed by using a facial image suitable for face authentication, the probability of a holdup at the gate decreases due to decrease in an unsuccessful authentication count, enabling smooth passage through the gate and alleviation of congestion. Furthermore, a confirmation count of an attendant decreases in a case of confirmation by the attendant being required on unsuccessful authentication or the like, leading to reduced personnel expenses.

Third Example Embodiment

Figure 9:
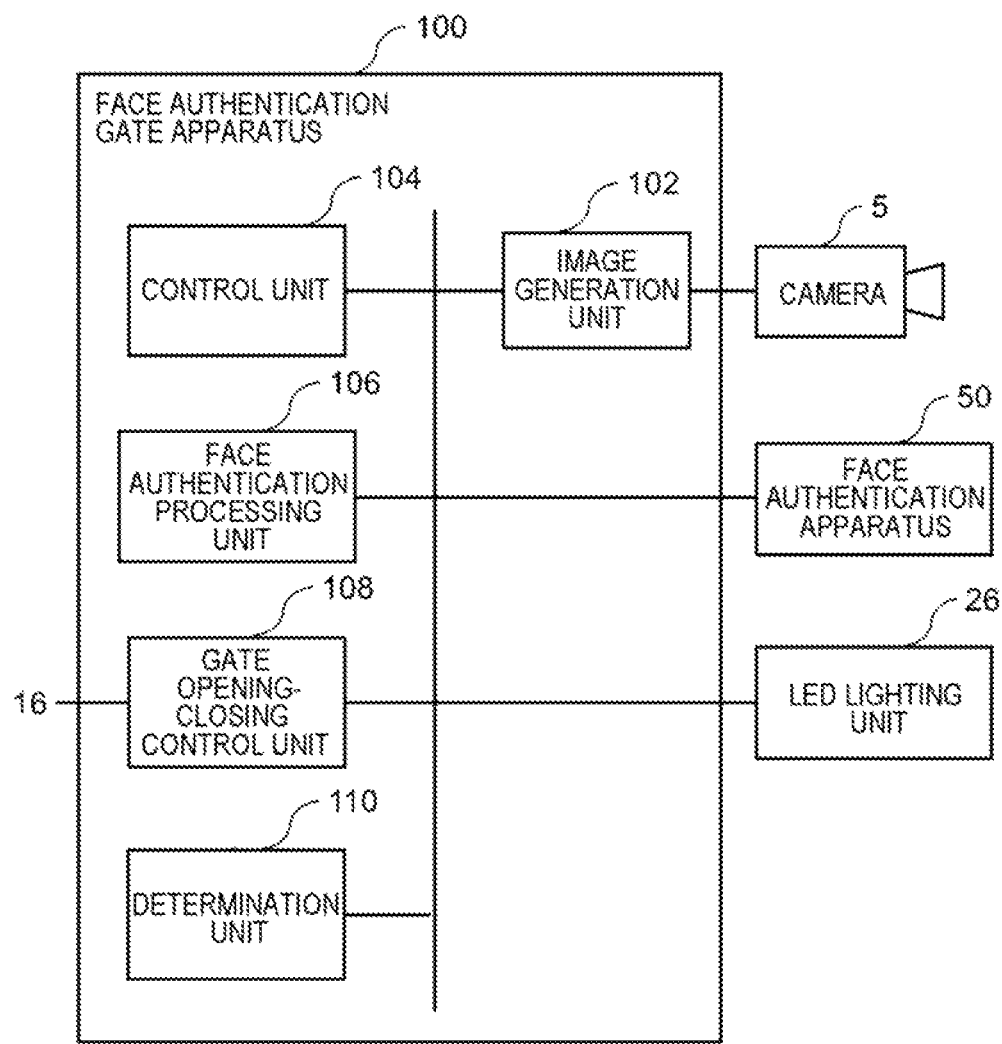
FIG. 9 is a diagram illustrating a functional configuration example of a face authentication gate apparatus according to an example embodiment.

FIG. 9 is a diagram illustrating a functional configuration example of a face authentication gate apparatus 100 according to the present example embodiment. The face authentication gate apparatus 100 according to the present example embodiment is similar to at least one of those according to the first example embodiment and the second example embodiment except for including a configuration for controlling an LED lighting unit 26, based on an ambient environment at an image capture timing of an authentication target person. The face authentication gate apparatus 100 in FIG. 9 includes a configuration similar to that of the face authentication gate apparatus 100 according to the second example embodiment in FIG. 7 and further includes a determination unit 110. Note that the determination unit 110 according to the present example embodiment may also be combined with the configuration of the face authentication apparatus 10 in FIG. 4.

FIG. 10 is a diagram for illustrating a method for controlling the LED lighting unit 26 according to the present example embodiment.

The LED lighting unit 26 includes a plurality of light sources (such as LEDs) arranged in a height direction h. A control unit 104 controls the intensity of at least part of the plurality of light sources according to a position 30 of the face of a person.

The light source in the LED lighting unit 26 are physically or electrically divided into a plurality of parts 28 in a vertical direction, and the plurality of parts 28 are individually controllable.

Figure 10A:
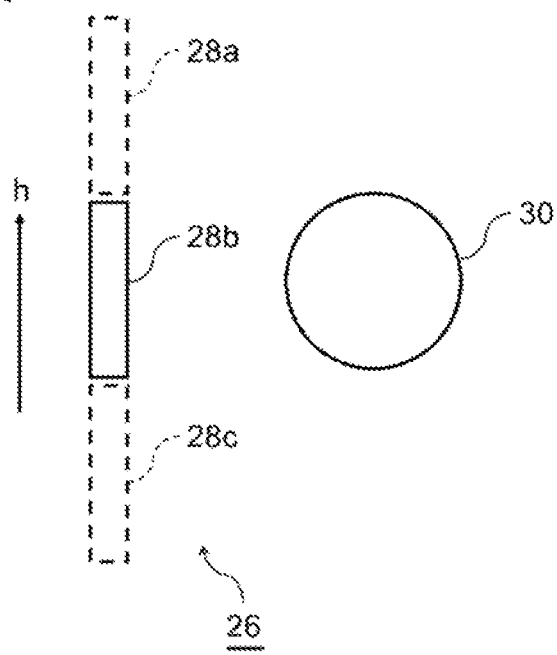
FIGS. 10A and 10B are diagrams for each illustrating a method for controlling an LED lighting unit in the face authentication gate apparatus according to the example embodiment.
Figure 10B:
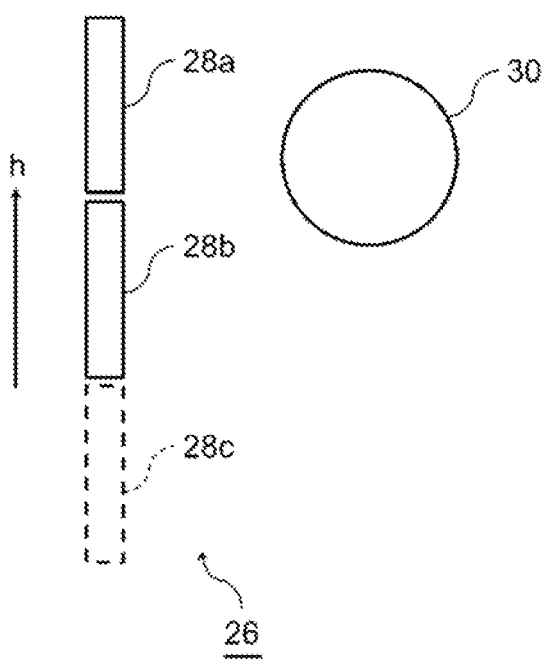

In the example in FIG. 10, for example, the LED lighting unit 26 is controlled in three parts 28a, 28b, and 28c. A part of the LED lighting unit 26 at the position of the face of an authentication target person is determined and turned on. In the example in FIG. 10, a part 28 being turned on is indicated by solid lines, and a part 28 being turned off is indicated by broken lines. Note that only one LED lighting unit 26 out of two LED lighting units 26 on both sides of the display unit 7 in FIG. 3 is illustrated in FIG. 10. For example, in an example in FIG. 10A, the part 28b of the LED lighting unit 26 corresponding to the position 30 of the face of the authentication target person is controlled to be turned on by the control unit 104. In an example in FIG. 10B, the part 28a and the part 28b of the LED lighting unit 26 corresponding to the position 30 of the face of the authentication target person are controlled to be turned on by the control unit 104.

Only the part 28a of the LED lighting unit 26 corresponds to the position 30 of the face of the person in the example in FIG. 10A; and on the other hand, when the position 30 of the face of the person extends over and corresponds to two parts of the LED lighting unit 26 as is the case in FIG. 10B, both the part 28a and the part 28b of the LED lighting unit 26 are turned on. While various methods for determining the position 30 of the face of a person and a part 28 to be lighting-controlled are considered and are exemplified below, the method is not limited thereto.

For example, at least a part 28 of the LED lighting unit 26 at the height of the position of the eyes of a face-detected person is selected as a target to be turned on. Furthermore, when the height of the eyes of the person falls within a range outside a range (upper 10% and lower 10%) within 80% from the center of a part 28 of the LED lighting unit 26 in the vertical direction, another part 28 adjoining the range may also be selected as a target to be turned on.

Alternatively, intensity may be adjusted according to the distance between the face of an authentication target person and the LED lighting unit 26. For example, as the face of an authentication target person gets closer to the LED lighting unit 26, blown-out highlights of the face is more likely to occur and narrowing and blinking of eyes increase due to glare (closed eyes are inappropriate for face collation), and therefore the intensity of the LED lighting unit 26 may be decreased in order to reduce the risk. Further, as the face of an authentication target person becomes more distant from the LED lighting unit 26, light is less likely to reach, and therefore the intensity of the LED lighting unit 26 may be increased.

Furthermore, a face authentication processing unit 106 acquires color information of the face of a person and color information of an ambient environment from a face authentication apparatus 50. Then, the control unit 104 controls the LED lighting unit 26 by using the acquired color information of the face of the person and the acquired color information of the ambient environment.

According to the present example embodiment, in order to allow acquisition of color information of the face of a person and color information of an ambient environment from the face authentication apparatus 50, an image is captured by using a camera 5 by adjusting an angle of view in such a way that the image includes the person being a recognition target and an area around the person (such as the background and a space on both sides of the person). Alternatively, as another example, the determination unit 110 may make determination on a light environment, based on observed values of illuminometers (unillustrated) installed inside a gate and in an area around the gate in addition to the color information.

The determination unit 110 makes the following determination on a light environment, based on the difference between acquired color information of the face of a person and acquired color information of an ambient environment.
(a1) When the brightness of the face is equal to or greater than a certain value and the brightness difference between the face and the ambient environment is small, the light environment is determined to be follow light.
(a2) When the brightness of the face is less than the certain value and the brightness difference between the face and the ambient environment is small, the light environment is determined to be a dark place.
(a3) When the brightness of the face is less than the certain value and the brightness difference between the face and the ambient environment is large, the light environment is determined to be backlight.
(a4) When only part of the brightness of the face is high and the brightness difference between the face and the ambient environment is small, the light environment is determined to be oblique light.

The control unit 104 controls the intensity of the LED lighting unit 26, based on the determination result by the determination unit 110.

For example, the control unit 104 controls the intensity of the LED lighting unit 26 as follows, based on the aforementioned determination result by the determination unit 110.
(b1) When the light environment is follow light, the entire lighting is turned off.
(b2) When the light environment is a dark place, lighting is turned on, and the intensity of the lighting is set in such a way that the brightness of the face is equal to or greater than a certain value.
(b3) When the light environment is backlight, lighting is turned on, and the intensity of the lighting is set in such a way that the brightness of the face is equal to or greater than the certain value.
(b4) When the light environment is oblique light, lighting is turned on and the intensity of the lighting is set in such a way that the brightness of the face is equal to or greater than the certain value and is uniform.

Setting of the intensity of the LED lighting unit 26 will be described.

An optimum value of an LED for the brightness difference between the face and the ambient environment when the LED is turned off is preregistered in a storage apparatus (unillustrated). The intensity of each LED in the LED lighting unit 26 can be set based on the registered optimum value of the LED. Alternatively, image capture may be performed again with the camera 5 after the intensity of an LED is changed by a specified amount, and when color information of the face in the generated facial image is inappropriate, the intensity of the LED may be changed again. Optimization may be performed by repeating the processing described above.

Further, an upper limit may be provided in such a way that the intensity of an LED is set in a range good for visual observation and in a range not causing blown-out highlights of the face.

As for oblique light, in order to brighten an area around a dark part of the face, only part of the plurality of LEDs in the LED lighting unit 26 may be turned on.

When a surrounding light environment exceeds a limit of ability of an LED to make a correction, for example, the control unit 104 may include a mechanism for giving an instruction for or automatically controlling lowering of a curtain or a blind around the face authentication gate apparatus 100 and lighting of a ceiling light. Alternatively, the control unit 104 may additionally implement parameter control of the camera 5 (such as exposure control).

The present example embodiment provides effects similar to those provided by the aforementioned example embodiments.

While the example embodiments have been described above with reference to the drawings, the example embodiments are exemplifications, and various configurations other than those described above may be employed.

For example, the LED lighting units 26 each extending in the height direction of the camera unit 20 are arranged on both sides of the display unit 7 and the camera 5 in FIG. 3. Aside from this configuration, the LED lighting unit 26 may be placed in such a way as to surround at least either one of the display unit 7 and the camera 5. Alternatively, a plurality of light source groups each acquired by arranging a plurality of light sources in a horizontal direction may be spaced in the height direction. For example, the light source groups may be placed above and below each camera 5.

Figure 11A:
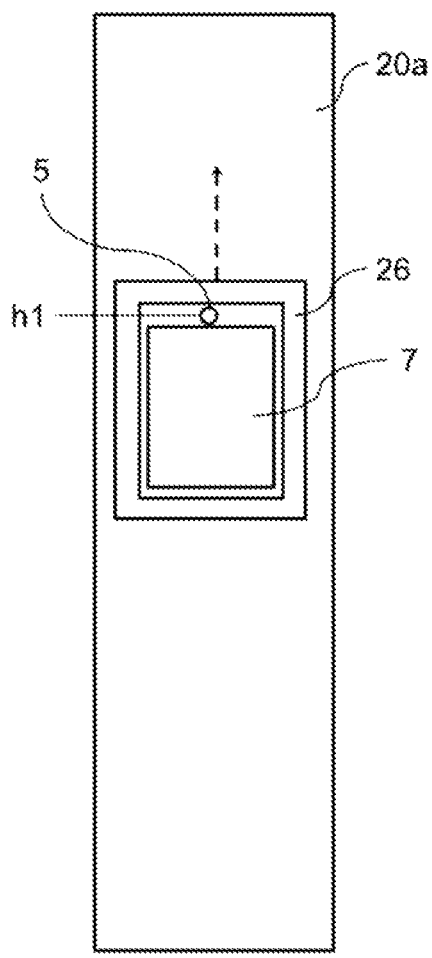
FIGS. 11A and 11B are diagrams for each illustrating a method for controlling the LED lighting unit in the face authentication gate apparatus according to the example embodiment.
Figure 11B:
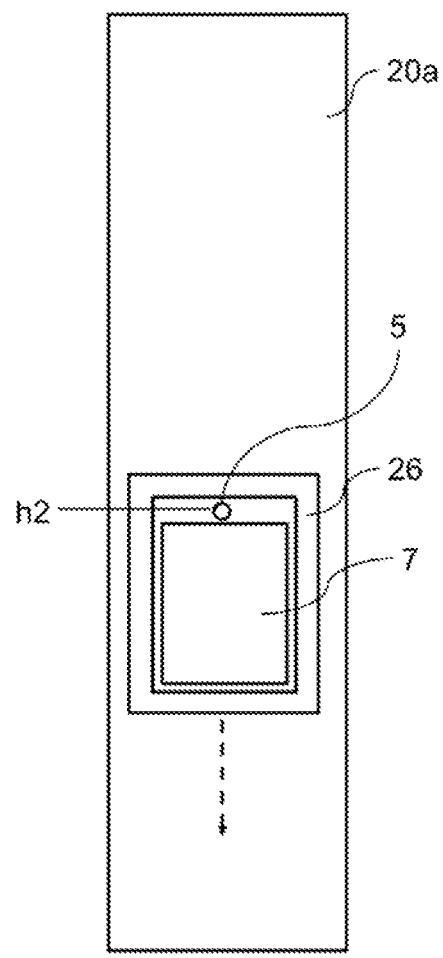

As illustrated in FIG. 11, a camera 5 may be provided on an outer frame of the display unit 7. In this example, the LED lighting unit 26 is placed around the display unit 7 including the outer frame on which the camera 5 is provided. For example, a tablet terminal including a camera 5 may be used as the display unit 7.

Furthermore, the projection position of light is controlled by turning on or turning off each part of the LED lighting unit 26 placed in the height direction in FIG. 10. In another example, movement-control may be performed in such a way as to make the height of the camera unit 20 go up and down, or the camera 5 and light sources (LEDs placed around the camera 5), as illustrated in FIG. 11. For example, the face authentication apparatus 50 may further include a movement control unit 60 performing movement-control in such a way as to move up and down the height of the camera unit 20, or the camera 5 and the light sources (LEDs placed around the camera 5) by adjusting and tracking to the position of the face of an authentication target person. FIG.

11 illustrates examples of the position of the camera 5 being moved to a height h1 (in FIG. 11A) and a height h2 (in FIG. 11B), respectively.

Furthermore, control by partially turning on/off the LED lighting unit 26 described in FIG. 10 may be combined with intensity control of the LED lighting unit 26 according to the third example embodiment. For example, the LED lighting unit 26 may perform control of increasing or decreasing brightness of at least part of the light source or the entire light source.

Furthermore, a half mirror may be provided at the front of the camera unit 20 at a position covering the display unit 7 and the camera 5. Note that the half mirror may cover at least part of the front (person side) of the display unit 7 and the camera 5. In this structure, since a reflection of a person facing the camera unit 20 appears in the half mirror, the person is naturally more likely to turn eyes on the reflection of the person in the mirror and therefore turns the face to the camera 5 behind the half mirror, and an image of the face of the person can be captured by the camera 5 through the half mirror. Further, a screen displayed on the display unit 7 can be presented to the person through the half mirror.

While some non-limiting embodiments have been described with reference to example embodiments and examples thereof, the some non-limiting embodiments are not limited to the aforementioned example embodiments and examples. Various changes and modifications that may be understood by a person skilled in the art may be made to the configurations and details of some non-limiting embodiments without departing from the scope of the some non-limiting embodiments. Note that when information about a user is acquired and used in some non-limiting embodiments, the acquisition and use are assumed to be performed legally.

The whole or part of the example embodiments described above may be described as, but not limited to, the following supplementary notes.

1. A face authentication apparatus including:
    an image generation unit that generates a first image by capturing an image of a person;
    a control unit that, when the first image does not satisfy a criterion for face collation, controls lighting and causes the image generation unit to generate a second image by capturing an image of the person again; and
    a face authentication unit that executes face authentication by using the first image or the second image.
2. The face authentication apparatus according to 1., wherein
    the face authentication unit performs the face authentication by detecting a face of the person from the first image or the second image and determining a feature value of the face of the person, and
    the criterion is that the feature value of the face of the person detected from the first image is determinable by the face authentication unit.
3. The face authentication apparatus according to 1. or 2., wherein
    the lighting includes a plurality of light sources being arranged in a height direction, and
    the control unit controls intensity of at least part of the plurality of light sources according to a position of the face of the person.
4. The face authentication apparatus according to any one of 1. to 3., wherein
    the face authentication unit acquires color information of the face of the person and color information of an ambient environment, and
    the control unit controls the lighting by using acquired color information of the face of the person and acquired color information of the ambient environment.
5. The face authentication apparatus according to 4., further including
    a determination unit that makes determination on a light environment, based on a difference between the acquired color information of the face of the person and the acquired color information of the ambient environment, wherein
    the determination unit
        determines that the light environment is follow light when brightness of the face is equal to or greater than a certain value and a brightness difference between the face and the ambient environment is small,
        determines that the light environment is a dark place when the brightness of the face is less than a certain value and a brightness difference between the face and the ambient environment is small,
        determines that the light environment is backlight when the brightness of the face is less than a certain value and a brightness difference between the face and the ambient environment is large, and
        determines that the light environment is oblique light when only part of the brightness of the face is high and a brightness difference between the face and the ambient environment is small, and
    the control unit controls intensity of the lighting, based on a determination result by the determination unit.
6. The face authentication apparatus according to 5., wherein
    the control unit
        turns off the entire lighting when the determination result indicates that the light environment is the follow light,
        turns on the lighting and sets the intensity of the lighting in such a way that the brightness of the face is equal to or greater than the certain value when the determination result indicates that the light environment is the dark place,
        turns on the lighting and sets the intensity of the lighting in such a way that the brightness of the face is equal to or greater than the certain value when the determination result indicates that the light environment is the backlight, and
        turns on the lighting and sets the intensity of the lighting in such a way that the brightness of the face is equal to or greater than the certain value and is uniform when the determination result indicates that the light environment is the oblique light.
7. A face authentication apparatus control method including, by a face authentication apparatus:
    generating a first image by capturing an image of a person;
    when the first image does not satisfy a criterion for face collation, controlling lighting and generating a second image by capturing an image of the person again; and
    executing face authentication by using the first image or the second image.
8. The face authentication apparatus control method according to 7., further including, by the face authentication apparatus,
    performing the face authentication by detecting a face of the person from the first image or the second image and determining a feature value of the face of the person, wherein
    the criterion is that the feature value of the face of the person detected from the first image is determinable when the face authentication is performed.

9. The face authentication apparatus control method according to 7. or 8., wherein
the lighting includes a plurality of light sources being arranged in a height direction, and
the face authentication apparatus control method further includes, by the face authentication apparatus,
controlling intensity of at least part of the plurality of light sources according to a position of the face of the person.

10. The face authentication apparatus control method according to any one of 7. to 9., further including, by the face authentication apparatus:
acquiring color information of the face of the person and color information of an ambient environment; and
controlling the lighting by using acquired color information of the face of the person and acquired color information of the ambient environment.

11. The face authentication apparatus control method according to 10., further including, by the face authentication apparatus:
making determination on a light environment, based on a difference between the acquired color information of the face of the person and the acquired color information of the ambient environment;
in the determination,
determining that the light environment is follow light when brightness of the face is equal to or greater than a certain value and a brightness difference between the face and the ambient environment is small,
determining that the light environment is a dark place when the brightness of the face is less than a certain value and a brightness difference between the face and the ambient environment is small,
determining that the light environment is backlight when the brightness of the face is less than a certain value and a brightness difference between the face and the ambient environment is large, and
determining that the light environment is oblique light when only part of the brightness of the face is high and a brightness difference between the face and the ambient environment is small; and
controlling intensity of the lighting, based on a result of the determination.

12. The face authentication apparatus control method according to 11., further including, by the face authentication apparatus:
turning off the entire lighting when a result of the determination indicates that the light environment is the follow light;
turning on the lighting and setting the intensity of the lighting in such a way that the brightness of the face is equal to or greater than the certain value when a result of the determination indicates that the light environment is the dark place;
turning on the lighting and setting the intensity of the lighting in such a way that the brightness of the face is equal to or greater than the certain value when a result of the determination indicates that the light environment is the backlight; and
turning on the lighting and setting the intensity of the lighting in such a way that the brightness of the face is equal to or greater than the certain value and is uniform when a result of the determination indicates that the light environment is the oblique light.

13. A program for causing a computer to execute:
a procedure for generating a first image by capturing an image of a person;
a procedure for, when the first image does not satisfy a criterion for face collation, controlling lighting and generating a second image by capturing an image of the person again; and
a procedure for executing face authentication by using the first image or the second image.

14. The program according to 13., further causing a computer to execute
a procedure for performing the face authentication by detecting a face of the person from the first image or the second image and determining a feature value of the face of the person, wherein
the criterion is that the feature value of the face of the person detected from the first image is determinable when the face authentication is performed.

15. The program according to 13. or 14., wherein
the lighting includes a plurality of light sources being arranged in a height direction, and
the program further causes a computer to execute
a procedure for controlling intensity of at least part of the plurality of light sources according to a position of the face of the person.

16. The program according to any one of 13. to 15., further causing a computer to execute:
a procedure for acquiring color information of the face of the person and color information of an ambient environment; and
a procedure for controlling the lighting by using acquired color information of the face of the person and acquired color information of the ambient environment.

17. The program according to 16., further causing a computer to execute
a procedure for making determination on a light environment, based on a difference between the acquired color information of the face of the person and the acquired color information of the ambient environment, wherein
the procedure for making determination includes:
a procedure for determining that the light environment is follow light when brightness of the face is equal to or greater than a certain value and a brightness difference between the face and the ambient environment is small;
a procedure for determining that the light environment is a dark place when the brightness of the face is less than a certain value and a brightness difference between the face and the ambient environment is small;
a procedure for determining that the light environment is backlight when the brightness of the face is less than a certain value and a brightness difference between the face and the ambient environment is large; and
a procedure for determining that the light environment is oblique light when only part of the brightness of the face is high and a brightness difference between the face and the ambient environment is small, and
the program further causes a computer to execute
a procedure for controlling intensity of the lighting, based on a result of the determination.

18. The program according to 17., further causing a computer to execute:
a procedure for turning off the entire lighting when a result of the determination indicates that the light environment is the follow light;
a procedure for turning on the lighting and setting the intensity of the lighting in such a way that the brightness of the face is equal to or greater than the certain value when a result of the determination indicates that the light environment is the dark place;

a procedure for turning on the lighting and setting the intensity of the lighting in such a way that the brightness of the face is equal to or greater than the certain value when a result of the determination indicates that the light environment is the backlight; and a procedure for turning on the lighting and setting the intensity of the lighting in such a way that the brightness of the face is equal to or greater than the certain value and is uniform when a result of the determination indicates that the light environment is the oblique light.

19. A face authentication system including:
a face authentication apparatus; and
an image processing apparatus, wherein
the image processing apparatus includes:
   an image generation unit that generates a first image by capturing an image of a person;
   a control unit that, when the first image does not satisfy a criterion for face collation, controls lighting and causes the image generation unit to generate a second image by capturing an image of the person again; and
   a face authentication processing unit that causes the face authentication apparatus to execute face authentication by using the first image or the second image.

20. The face authentication system according to 19., wherein
the face authentication processing unit in the image processing apparatus causes the face authentication apparatus to perform the face authentication by detecting a face of the person from the first image or the second image and determining a feature value of the face of the person, and
the criterion is that the feature value of the face of the person detected from the first image is determinable by the face authentication apparatus.

21. The face authentication system according to 19. or 20., wherein
the lighting includes a plurality of light sources being arranged in a height direction, and
the control unit in the image processing apparatus controls intensity of at least part of the plurality of light sources according to a position of the face of the person.

22. The face authentication system according to any one of 19. to 21., wherein
the face authentication processing unit in the image processing apparatus acquires color information of the face of the person and color information of an ambient environment from the face authentication apparatus, and
the control unit in the image processing apparatus controls the lighting by using acquired color information of the face of the person and acquired color information of the ambient environment.

23. The face authentication system according to 22., wherein
the image processing apparatus further includes
   a determination unit that makes determination on a light environment, based on a difference between the acquired color information of the face of the person and the acquired color information of the ambient environment,
the determination unit in the image processing apparatus determines that the light environment is follow light when brightness of the face is equal to or greater than a certain value and a brightness difference between the face and the ambient environment is small,
determines that the light environment is a dark place when the brightness of the face is less than a certain value and a brightness difference between the face and the ambient environment is small,
determines that the light environment is backlight when the brightness of the face is less than a certain value and a brightness difference between the face and the ambient environment is large, and
determines that the light environment is oblique light when only part of the brightness of the face is high and a brightness difference between the face and the ambient environment is small, and
the control unit in the image processing apparatus controls intensity of the lighting, based on a determination result by the determination unit in the image processing apparatus.

24. The face authentication system according to 23., wherein
the control unit in the image processing apparatus
   turns off the entire lighting when the determination result indicates that the light environment is the follow light,
   turns on the lighting and sets the intensity of the lighting in such a way that the brightness of the face is equal to or greater than the certain value when the determination result indicates that the light environment is the dark place,
   turns on the lighting and sets the intensity of the lighting in such a way that the brightness of the face is equal to or greater than the certain value when the determination result indicates that the light environment is the backlight, and
   turns on the lighting and sets the intensity of the lighting in such a way that the brightness of the face is equal to or greater than the certain value and is uniform when the determination result indicates that the light environment is the oblique light.

25. A face authentication gate apparatus including
a gate opening-closing control unit that controls opening and closing of a gate through which a person passes, by using a face authentication result of face authentication executed by the face authentication apparatus according to any one of 1. to 6. by using a first image or a second image generated by capturing an image of the person passing through the gate.

26. A face authentication gate apparatus including:
an image generation unit that generates a first image by capturing an image of a person;
a control unit that, when the first image does not satisfy a criterion for face collation, controls lighting and causes the image generation unit to generate a second image by capturing an image of the person again;
a face authentication unit that executes face authentication by using the first image or the second image; and
a gate opening-closing control unit that controls opening and closing of the a gate through which the person passes, by using a result of the face authentication by the face authentication unit.

27. The face authentication gate apparatus according to 26., wherein
the face authentication unit performs the face authentication by detecting a face of the person from the first image or the second image and determining a feature value of a face of the person, and
the criterion is that the feature value of a face of the person detected from the first image is determinable by the face authentication unit.

28. The face authentication gate apparatus according to 26. or 27., wherein
the lighting includes a plurality of light sources being arranged in a height direction, and
the control unit controls intensity of at least part of the plurality of light sources according to a position of a face of the person.

29. The face authentication gate apparatus according to any one of 26. to 28., wherein
the face authentication unit acquires color information of a face of the person and color information of an ambient environment, and
the control unit controls the lighting by using acquired color information of a face of the person and acquired color information of the ambient environment.

30. The face authentication gate apparatus according to 29., further including
a determination unit that makes determination on a light environment, based on a difference between acquired color information of a face of the person and acquired color information of the ambient environment, wherein
the determination unit
determines that the light environment is follow light when brightness of the face is equal to or greater than a certain value and a brightness difference between the face and the ambient environment is small,
determines that the light environment is a dark place when brightness of the face is less than a certain value and a brightness difference between the face and the ambient environment is small,
determines that the light environment is backlight when brightness of the face is less than a certain value and a brightness difference between the face and the ambient environment is large, and
determines that the light environment is oblique light when only part of brightness of the face is high and a brightness difference between the face and the ambient environment is small, and
the control unit controls intensity of the lighting, based on a determination result by the determination unit.

31. The face authentication gate apparatus according to 30., wherein
the control unit
turns off the entire lighting when the determination result indicates that the light environment is the follow light,
turns on the lighting and sets the intensity of the lighting in such a way that the brightness of the face is equal to or greater than the certain value when the determination result indicates that the light environment is the dark place,
turns on the lighting and sets the intensity of the lighting in such a way that the brightness of the face is equal to or greater than the certain value when the determination result indicates that the light environment is the backlight, and
turns on the lighting and sets the intensity of the lighting in such a way that the brightness of the face is equal to or greater than the certain value and is uniform when the determination result indicates that the light environment is the oblique light.

32. A face authentication gate apparatus control method including, by a face authentication gate apparatus,
controlling opening and closing of a gate through which a person passes, by using a face authentication result of face authentication executed by the face authentication apparatus according to any one of 1. to 6. by using a first image or a second image generated by capturing an image of the person passing through the gate.

33. A face authentication gate apparatus control method including, by a face authentication gate apparatus:
generating a first image by capturing an image of a person;
when the first image does not satisfy a criterion for face collation, controlling lighting and generating a second image by capturing an image of the person again;
executing face authentication by using the first image or the second image; and
controlling opening and closing of the a gate through which the person passes, by using a result of the face authentication.

34. The face authentication gate apparatus control method according to 33., further including, by the face authentication gate apparatus,
performing the face authentication by detecting a face of the person from the first image or the second image and determining a feature value of a face of the person, wherein
the criterion is that the feature value of a face of the person detected from the first image is determinable when the face authentication is performed.

35. The face authentication gate apparatus control method according to 33. or 34., wherein
the lighting includes a plurality of light sources being arranged in a height direction, and
the face authentication gate apparatus control method further includes, by the face authentication gate apparatus,
controlling intensity of at least part of the plurality of light sources according to a position of a face of the person.

36. The face authentication gate apparatus control method according to any one of 33. to 35., further including, by the face authentication gate apparatus:
acquiring color information of a face of the person and color information of an ambient environment; and
controlling the lighting by using acquired color information of a face of the person and acquired color information of the ambient environment.

37. The face authentication gate apparatus control method according to 36., further including, by the face authentication gate apparatus:
making determination on a light environment, based on a difference between acquired color information of a face of the person and acquired color information of the ambient environment;
in the determination,
determining that the light environment is follow light when brightness of the face is equal to or greater than a certain value and a brightness difference between the face and the ambient environment is small,
determining that the light environment is a dark place when brightness of the face is less than a certain value and a brightness difference between the face and the ambient environment is small,
determining that the light environment is backlight when brightness of the face is less than a certain value and a brightness difference between the face and the ambient environment is large, and
determining that the light environment is oblique light when only part of brightness of the face is high and a brightness difference between the face and the ambient environment is small; and controlling intensity of the lighting, based on a result of the determination.

38. The face authentication gate apparatus control method according to 37., further including, by the face authentication gate apparatus:
turning off the entire lighting when a result of the determination indicates that the light environment is the follow light;
turning on the lighting and setting the intensity of the lighting in such a way that the brightness of the face is equal to or greater than the certain value when a result of the determination indicates that the light environment is the dark place;
turning on the lighting and setting the intensity of the lighting in such a way that the brightness of the face is equal to or greater than the certain value when a result of the determination indicates that the light environment is the backlight; and
turning on the lighting and setting the intensity of the lighting in such a way that the brightness of the face is equal to or greater than the certain value and is uniform when a result of the determination indicates that the light environment is the oblique light.

39. A program for causing a computer to execute
a procedure for controlling opening and closing of a gate through which a person passes, by using a face authentication result of face authentication executed by the face authentication apparatus according to any one of 1. to 6. by using a first image or a second image generated by capturing an image of the person passing through the gate.

40. A program for causing a computer to execute:
a procedure for generating a first image by capturing an image of a person;
a procedure for, when the first image does not satisfy a criterion for face collation, controlling lighting and generating a second image by capturing an image of the person again;
a procedure for executing face authentication by using the first image or the second image; and
a procedure for controlling opening and closing of the a gate through which the person passes, by using a result of the face authentication.

41. The program according to 40., further causing a computer to execute
a procedure for performing the face authentication by detecting a face of the person from the first image or the second image and determining a feature value of a face of the person, wherein
the criterion is that the feature value of a face of the person detected from the first image is determinable when the face authentication is performed.

42. The program according to 40. or 41., wherein
the lighting includes a plurality of light sources being arranged in a height direction, and
the program further causes a computer to execute
a procedure for controlling intensity of at least part of the plurality of light sources according to a position of a face of the person.

43. The program according to any one of 40. to 42., further causing a computer to execute:
a procedure for acquiring color information of a face of the person and color information of an ambient environment; and
a procedure for controlling the lighting by using acquired color information of a face of the person and acquired color information of the ambient environment.

44. The program according to 43., further causing a computer to execute
a procedure for making determination on a light environment, based on a difference between acquired color information of a face of the person and acquired color information of the ambient environment, wherein
the procedure for making the determination includes:
a procedure for determining that the light environment is follow light when brightness of the face is equal to or greater than a certain value and a brightness difference between the face and the ambient environment is small;
a procedure for determining that the light environment is a dark place when brightness of the face is less than a certain value and a brightness difference between the face and the ambient environment is small;
a procedure for determining that the light environment is backlight when brightness of the face is less than a certain value and a brightness difference between the face and the ambient environment is large; and
a procedure for determining that the light environment is oblique light when only part of brightness of the face is high and a brightness difference between the face and the ambient environment is small, and
the program further causes a computer to execute
a procedure for controlling intensity of the lighting, based on a result of the determination.

45. The program according to 44., further causing a computer to execute:
a procedure for turning off the entire lighting when a result of the determination indicates that the light environment is the follow light;
a procedure for turning on the lighting and setting the intensity of the lighting in such a way that the brightness of the face is equal to or greater than the certain value when a result of the determination indicates that the light environment is the dark place;
a procedure for turning on the lighting and setting the intensity of the lighting in such a way that the brightness of the face is equal to or greater than the certain value when a result of the determination indicates that the light environment is the backlight; and
a procedure for turning on the lighting and setting the intensity of the lighting in such a way that the brightness of the face is equal to or greater than the certain value and is uniform when a result of the determination indicates that the light environment is the oblique light.

46. A face authentication gate system including:
a face authentication apparatus; and
a face authentication gate apparatus, wherein
the face authentication gate apparatus includes:
an image generation unit that generates a first image by capturing an image of a person;
a control unit that, when the first image does not satisfy a criterion for face collation, controlling lighting and causing the image generation unit to generate a second image by capturing an image of the person again;
a face authentication processing unit that causes the face authentication apparatus to execute face authentication by using the first image or the second image; and
a gate opening-closing control unit that controls opening and closing of a gate through which a person passes, by using a face authentication result of the face authentication executed by the face authentication apparatus by using the first image or the second image generated by capturing an image of the person passing through the gate.

47. The face authentication system according to 46., wherein
the face authentication processing unit in the face authentication gate apparatus causes the face authentication apparatus to perform the face authentication by detecting a face of the person from the first image or the second image and determining a feature value of a face of the person, and
the criterion is that the feature value of a face of the person detected from the first image is determinable by the face authentication apparatus.

48. The face authentication system according to 46. or 47., wherein
the lighting includes a plurality of light sources being arranged in a height direction, and
the control unit in the face authentication gate apparatus controls intensity of at least part of the plurality of light sources according to a position of a face of the person.

49. The face authentication system according to any one of 46. to 48., wherein
the face authentication processing unit in the image processing apparatus acquires color information of a face of the person and color information of an ambient environment from the face authentication apparatus, and
the control unit in the face authentication gate apparatus controls the lighting by using acquired color information of a face of the person and acquired color information of the ambient environment.

50. The face authentication system according to 49., wherein
the face authentication gate apparatus further includes
a determination unit that makes determination on a light environment, based on a difference between acquired color information of a face of the person and acquired color information of the ambient environment,
the determination unit in the face authentication gate apparatus
determines that the light environment is follow light when brightness of the face is equal to or greater than a certain value and a brightness difference between the face and the ambient environment is small,
determines that the light environment is a dark place when brightness of the face is less than a certain value and a brightness difference between the face and the ambient environment is small,
determines that the light environment is backlight when brightness of the face is less than a certain value and a brightness difference between the face and the ambient environment is large, and
determines that the light environment is oblique light when only part of brightness of the face is high and a brightness difference between the face and the ambient environment is small, and
the control unit in the face authentication gate apparatus controls intensity of the lighting, based on a determination result by the determination unit in the face authentication gate apparatus.

51. The face authentication system according to 50., wherein
the control unit in the face authentication gate apparatus turns off the entire lighting when the determination result indicates that the light environment is the follow light,
turns on the lighting and sets the intensity of the lighting in such a way that the brightness of the face is equal to or greater than the certain value when the determination result indicates that the light environment is the dark place,
turns on the lighting and sets the intensity of the lighting in such a way that the brightness of the face is equal to or greater than the certain value when the determination result indicates that the light environment is the backlight, and
turns on the lighting and sets the intensity of the lighting in such a way that the brightness of the face is equal to or greater than the certain value and is uniform when the determination result indicates that the light environment is the oblique light.

The invention claimed is:
1. A face authentication apparatus comprising:
at least one memory storing instructions; and
at least one processor configured to execute the instructions to:
generate a first image by capturing an image of a person;
when the first image does not satisfy a criterion for face collation:
detect a face of the person in the first image;
determine a position of eyes of the person of which the face of which has been detected;
control a light source unit including a plurality of parts arranged in height direction; and
generate a second image by capturing an image of the person again; and
execute face authentication by using the first image or the second image,
wherein the at least one processor is further configured to execute the instructions to
when the first image does not satisfy the criterion for face collation:
in a case where a height of the position of eyes of the person falls within a range of 80% from a center of a part of the light source unit, select the part, as a target to be turned on; and
control the light source unit to turn on the selected part.

2. The face authentication apparatus according to claim 1, wherein the at least one processor is further configured to execute the instructions to:
perform the face authentication by detecting a face of the person from the first image or the second image and determining a feature value of the face of the person, and
the criterion is that the feature value of the face of the person detected from the first image is determinable by the face authentication.

3. The face authentication apparatus according to claim 1, wherein the at least one processor configured to execute the instructions to:
acquire color information of the face of the person and color information of an ambient environment, and
control the light source unit by using acquired color information of the face of the person and acquired color information of the ambient environment.

4. A face authentication apparatus control method performed by a face authentication apparatus and comprising:
generating a first image by capturing an image of a person;

when the first image does not satisfy a criterion for face collation:
  detecting a face of the person in the first image;
  determining a position of eyes of the person of which the face of which has been detected;
  controlling a light source unit including a plurality of parts arranged in height direction; and
  generating a second image by capturing an image of the person again; and
executing face authentication by using the first image or the second image,
wherein the face authentication apparatus control method further comprises
when the first image does not satisfy the criterion for face collation:
  in a case where a height of the position of eyes of the person falls within a range of 80% from a center of a part of the light source unit, selecting the part, as a target to be turned on; and
  controlling the light source unit to turn on the selected part.

5. The face authentication apparatus control method according to claim 4, further comprising, by the face authentication apparatus
performing the face authentication by detecting a face of the person from the first image or the second image and determining a feature value of the face of the person, wherein
the criterion is that the feature value of the face of the person detected from the first image is determinable when the face authentication is performed.

6. The face authentication apparatus control method according to claim 4, further comprising, by the face authentication apparatus:
  acquiring color information of the face of the person and color information of an ambient environment; and
  controlling the light source unit by using acquired color information of the face of the person and acquired color information of the ambient environment.

7. A non-transitory computer-readable storage medium storing a program executable by a computer to perform processing comprising: generating a first image by capturing an image of a person;
when the first image does not satisfy a criterion for face collation:
  detecting a face of the person in the first image;
  determining a position of eyes of the person of which the face of which has been detected;
  controlling a light source unit including a plurality of parts arranged in height direction; and
  generating a second image by capturing an image of the person again; and
executing face authentication by using the first image or the second image,
wherein the face authentication apparatus control method further comprises
when the first image does not satisfy the criterion for face collation:
  in a case where a height of the position of eyes of the person falls within a range of 80% from a center of a part of the light source unit, selecting the part, as a target to be turned on; and
  controlling the light source unit to turn on the selected part.

8. The non-transitory computer-readable storage medium according to claim 7, wherein the processing further comprises a procedure for performing the face authentication by detecting a face of the person from the first image or the second image and determining a feature value of the face of the person, wherein
the criterion is that the feature value of the face of the person detected from the first image is determinable when the face authentication is performed.

9. The non-transitory computer-readable storage medium according to claim 7, wherein the processing further comprises: a procedure for acquiring color information of the face of the person and color information of an ambient environment; and
  a procedure for controlling the light source unit by using acquired color information of the face of the person and acquired color information of the ambient environment.

10. A face authentication system comprising:
a face authentication apparatus; and
an image processing apparatus, wherein
the image processing apparatus includes:
at least one memory configured to store instructions; and
at least one processor configured to execute the instructions to:
  generate a first image by capturing an image of a person;
  when the first image does not satisfy a criterion for face collation:
    detect a face of the person in the first image;
    determine a position of eyes of the person of which the face of which has been detected;
    control a light source unit including a plurality of parts arranged in height direction; and
    generate a second image by capturing an image of the person again; and
  cause the face authentication apparatus to execute face authentication by using the first image or the second image,
wherein the at least one processor is further configured to execute the instructions to
when the first image does not satisfy the criterion for face collation:
  in a case where a height of the position of eyes of the person falls within a range of 80% from a center of a part of the light source unit, select the part, as a target to be turned on; and
  control the light source unit to turn on the selected part.

11. The face authentication system according to claim 10, wherein the at least one processor of the image processing apparatus is further configured to execute the instructions to:
cause the face authentication apparatus to perform the face authentication by detecting a face of the person from the first image or the second image and determining a feature value of the face of the person, and
the criterion is that the feature value of the face of the person detected from the first image is determinable by the face authentication apparatus.

12. The face authentication system according to claim 10, wherein
the at least one processor of the image processing apparatus is further configured to execute the instructions to:
acquire color information of the face of the person and color information of an ambient environment from the face authentication apparatus; and
control the light source unit by using acquired color information of the face of the person and acquired color information of the ambient environment.

13. A face authentication gate apparatus comprising
at least one memory storing instructions; and at least one processor configured to execute the instructions to:
control opening and closing of a gate through which a person passes, by using a face authentication result of face authentication executed by a face authentication apparatus by using a first image or a second image generated by capturing an image of the person passing through the gate,
wherein the face authentication apparatus includes
at least one memory storing instructions; and
at least one processor configured to execute the instructions to:
generate a first image by capturing an image of the person;
when the first image does not satisfy a criterion for face collation:
  detect a face of the person in the first image;
  determine a position of eyes of the person of which the face of which has been detected;
  control a light source unit including a plurality of parts arranged in height direction; and
  generate a second image by capturing an image of the person again; and
execute the face authentication by using the first image or the second image,
wherein the at least one processor of the face authentication apparatus is further configured to execute the instructions stored in the at least one memory of the face authentication apparatus to
when the first image does not satisfy the criterion for face collation:
  in a case where a height of the position of eyes of the person falls within a range of 80% from a center of a part of the light source unit, select the part, as a target to be turned on; and
  control the light source unit to turn on the selected part.

14. A face authentication gate apparatus control method performed by a face authentication gate apparatus and comprising
controlling opening and closing of a gate through which a person passes, by using a face authentication result of face authentication executed by a face authentication apparatus by using a first image or a second image generated by capturing an image of the person passing through the gate, wherein the face authentication apparatus includes
at least one memory storing instructions; and
at least one processor configured to execute the instructions to:
generate a first image by capturing an image of a person;
when the first image does not satisfy a criterion for face collation:
  detect a face of the person in the first image;
  determine a position of eyes of the person of which the face of which has been detected;
  control a light source unit including a plurality of parts arranged in height direction; and
  generate a second image by capturing an image of the person again; and
execute the face authentication by using the first image or the second image,
wherein the at least one processor of the face authentication apparatus is further configured to execute the instructions stored in the at least one memory of the face authentication apparatus to
when the first image does not satisfy the criterion for face collation:
  in a case where a height of the position of eyes of the person falls within a range of 80% from a center of a part of the light source unit, select the part, as a target to be turned on; and
  control the light source unit to turn on the selected part.

15. A non-transitory computer-readable storage medium storing a program executable by a computer to perform processing comprising
controlling opening and closing of a gate through which a person passes, by using a face authentication result of face authentication executed by a face authentication apparatus by using a first image or a second image generated by capturing an image of the person passing through the gate, wherein the face authentication apparatus includes
at least one memory storing instructions; and
at least one processor configured to execute the instructions to:
generate a first image by capturing an image of a person;
when the first image does not satisfy a criterion for face collation:
  detect a face of the person in the first image;
  determine a position of eyes of the person of which the face of which has been detected;
  control a light source unit including a plurality of parts arranged in height direction; and
  generate a second image by capturing an image of the person again; and
execute the face authentication by using the first image or the second image,
wherein the at least one processor of the face authentication apparatus is further configured to execute the instructions stored in the at least one memory of the face authentication apparatus to
when the first image does not satisfy the criterion for face collation:
  in a case where a height of the position of eyes of the person falls within a range of 80% from a center of a part of the light source unit, select the part, as a target to be turned on; and
  control the light source unit to turn on the selected part.

16. A face authentication gate system comprising:
a face authentication apparatus; and
a face authentication gate apparatus, wherein
the face authentication gate apparatus includes:
at least one memory configured to store instructions; and
at least one processor configured to execute the instructions to:
generate a first image by capturing an image of a person;
when the first image does not satisfy a criterion for face collation:
detect a face of the person in the first image;
  determine a position of eyes of the person of which the face of which has been detected;
  control a light source unit including a plurality of parts arranged in height direction; and
generate a second image by capturing an image of the person again;
  cause the face authentication apparatus to execute face authentication by using the first image or the second image;
control opening and closing of a gate through which a person passes, by using a face authentication result of the face authentication executed by the face authentication apparatus by using the first image or the second image generated by capturing the image of the person passing through the gate; and when the first image does not satisfy the criterion for face collation:
in a case where a height of the position of eyes of the person falls within a range of 80% from a center of a part of the light source unit, select the part, as a target to be turned on; and
control the light source unit to turn on the selected part.

17. The face authentication apparatus according to claim 1, wherein
the plurality of parts of the light source unit are physically or electrically divided, and are individually controllable, and
the at least one processor is further configured to execute the instructions to:
control the light source unit to turn on the selected part, and to turn off the other parts.

18. The face authentication apparatus according to claim 1, wherein
the at least one processor is further configured to execute the instructions to
in a case where the height of the position of eyes of the person falls within a range of upper 10% or lower 10% from the center of the selected part of the light source unit, select another part adjoining the selected part to add to the target to be turned on.

19. The face authentication apparatus control method according to claim 4, wherein
the plurality of parts of the light source unit are physically or electrically divided, and are individually controllable, and
the face authentication apparatus control method further comprises:
controlling the light source unit to turn on the selected part, and to turn off the other parts.

20. The face authentication apparatus control method according to claim 4, further comprising
in a case where the height of the position of eyes of the person falls within a range of upper 10% or lower 10% from the center of the selected part of the light source unit, select another part adjoining the selected part to add to the target to be turned on.

21. The non-transitory computer-readable storage medium according to claim 7, wherein
the plurality of parts of the light source unit are physically or electrically divided, and are individually controllable, and
the processing further comprises:
controlling the light source unit to turn on the selected part, and to turn off the other parts.

22. The non-transitory computer-readable storage medium according to claim 7, wherein the processing further comprises
in a case where the height of the position of eyes of the person falls within a range of upper 10% or lower 10% from the center of the selected part of the light source unit, select another part adjoining the selected part to add to the target to be turned on.

23. The face authentication system according to claim 10, wherein
the plurality of parts of the light source unit are physically or electrically divided, and are individually controllable, and
the at least one processor is further configured to execute the instructions to:
control the light source unit to turn on the selected part, and to turn off the other parts.

24. The face authentication system according to claim 10, wherein
the at least one processor is further configured to execute the instructions to
in a case where the height of the position of eyes of the person falls within a range of upper 10% or lower 10% from the center of the selected part of the light source unit, select another part adjoining the selected part to add to the target to be turned on.

25. The face authentication apparatus according to claim 3, the at least one processor is further configured to execute the instructions to:
make determination on a light environment, based on a difference between the acquired color information of the face of the person and the acquired color information of the ambient environment;
determine that the light environment is follow light when brightness of the face is equal to or greater than a certain value and a brightness difference between the face and the ambient environment is small;
determine that the light environment is a dark place when the brightness of the face is less than a certain value and a brightness difference between the face and the ambient environment is small;
determine that the light environment is backlight when the brightness of the face is less than a certain value and a brightness difference between the face and the ambient environment is large;
determine that the light environment is oblique light when only part of the brightness of the face is high and a brightness difference between the face and the ambient environment is small; and
control intensity of the lighting, based on a determination result.

26. The face authentication apparatus control method according to claim 6, further comprising, by the face authentication apparatus:
making determination on a light environment, based on a difference between the acquired color information of the face of the person and the acquired color information of the ambient environment;
in the determination,
determining that the light environment is follow light when brightness of the face is equal to or greater than a certain value and a brightness difference between the face and the ambient environment is small,
determining that the light environment is a dark place when the brightness of the face is less than a certain value and a brightness difference between the face and the ambient environment is small,
determining that the light environment is backlight when the brightness of the face is less than a certain value and a brightness difference between the face and the ambient environment is large, and
determining that the light environment is oblique light when only part of the brightness of the face is high and a brightness difference between the face and the ambient environment is small; and
controlling intensity of the lighting, based on a result of the determination.

27. The non-transitory computer-readable storage medium according to claim 9, wherein the program further causes a computer to execute
a procedure for making determination on a light environment, based on a difference between the acquired color information of the face of the person and the acquired color information of the ambient environment, wherein the procedure for making the determination includes:
a procedure for determining that the light environment is follow light when brightness of the face is equal to or greater than a certain value and a brightness difference between the face and the ambient environment is small;
a procedure for determining that the light environment is a dark place when the brightness of the face is less than a certain value and a brightness difference between the face and the ambient environment is small;
a procedure for determining that the light environment is backlight when the brightness of the face is less than a certain value and a brightness difference between the face and the ambient environment is large; and
a procedure for determining that the light environment is oblique light when only part of the brightness of the face is high and a brightness difference between the face and the ambient environment is small, and
the program further causes a computer to execute
a procedure for controlling intensity of the lighting, based on a result of the determination.

28. The face authentication system according to claim 12, wherein
the at least one processor of the image processing apparatus is further configured to execute the instructions to:
make determination on a light environment, based on a difference between the acquired color information of the face of the person and the acquired color information of the ambient environment;
determine that the light environment is follow light when brightness of the face is equal to or greater than a certain value and a brightness difference between the face and the ambient environment is small;
determine that the light environment is a dark place when the brightness of the face is less than a certain value and a brightness difference between the face and the ambient environment is small;
determine that the light environment is backlight when the brightness of the face is less than a certain value and a brightness difference between the face and the ambient environment is large;
determine that the light environment is oblique light when only part of the brightness of the face is high and a brightness difference between the face and the ambient environment is small; and
control intensity of the lighting, based on a determination result.

* * * * *